United States Patent
Eemani et al.

(10) Patent No.: US 11,487,439 B1
(45) Date of Patent: Nov. 1, 2022

(54) UTILIZING HOST MEMORY BUFFERS FOR STORAGE DEVICE RECOVERIES

(71) Applicant: Western Digital Technologies, Inc., San Jose, CA (US)

(72) Inventors: Kiran Kumar Eemani, Bangalore (IN); Sridhar Prudviraj Gunda, Bangalore (IN); Shivam Chawla, Bangalore (IN); Vikram Kumar, Bangalore (IN)

(73) Assignee: Western Digital Technologies, Inc., San Jose, CA (US)

( * ) Notice: Subject to any disclaimer, the term of this patent is extended or adjusted under 35 U.S.C. 154(b) by 0 days.

(21) Appl. No.: 17/331,958

(22) Filed: May 27, 2021

(51) Int. Cl.
*G06F 3/06* (2006.01)

(52) U.S. Cl.
CPC .......... *G06F 3/0619* (2013.01); *G06F 3/0656* (2013.01); *G06F 3/0679* (2013.01)

(58) Field of Classification Search
CPC ..... G06F 3/0619; G06F 3/0656; G06F 3/0679
See application file for complete search history.

(56) References Cited

U.S. PATENT DOCUMENTS

| | | | |
|---|---|---|---|
| 6,785,843 B1 * | 8/2004 | McRae | H04L 45/00 714/4.2 |
| 9,047,176 B2 | 6/2015 | Kettner | |
| 9,218,891 B2 | 12/2015 | Wu et al. | |
| 9,329,931 B2 | 5/2016 | Canepa et al. | |
| 9,384,351 B2 | 7/2016 | Mejia et al. | |
| 9,823,972 B2 | 11/2017 | Yu et al. | |
| 10,055,164 B2 | 8/2018 | Benisty et al. | |
| 10,055,236 B2 | 8/2018 | Erez et al. | |
| 10,558,576 B2 | 2/2020 | Gopalakrishnan et al. | |
| 10,705,902 B2 | 7/2020 | Sasidharan et al. | |
| 10,761,937 B2 | 9/2020 | Lappi et al. | |
| 10,802,934 B2 * | 10/2020 | Nguyen | G06F 3/0673 |
| 11,321,202 B2 * | 5/2022 | Cagno | G06F 3/065 |
| 2011/0258425 A1 * | 10/2011 | Galbo | G06F 3/062 711/E12.008 |
| 2017/0242606 A1 | 8/2017 | Vlaiko et al. | |
| 2020/0082088 A1 * | 3/2020 | Muthukumaran | G06F 21/64 |
| 2020/0174900 A1 * | 6/2020 | Cagno | G06F 11/1092 |
| 2021/0382780 A1 * | 12/2021 | Muthiah | G06F 11/0787 |

* cited by examiner

*Primary Examiner* — Hiep T Nguyen
(74) *Attorney, Agent, or Firm* — Ravi Mohan; Rutan & Tucker, LLP

(57) ABSTRACT

Storage devices include a memory array which stores host data received from a host computing device. During normal operations, the storage device may encounter a fatal error which can halt functionality. To restore functionality without system disconnection or third-party interventions, the storage device can store recovery data within a host memory buffer prior to encountering a fatal error. The recovery data can be replay protected memory data and/or firmware recovery data that can be written to the host memory buffer upon power on or during a firmware update. When a fatal error occurs, the recovery data can be accessed to try and rebuild file and mapping systems to restore full operation of the storage device. When full operational restoration is not possible, host data can at least be copied from the storage device prior to utilizing firmware recovery data to restore the storage device to an erased but functional state.

20 Claims, 8 Drawing Sheets

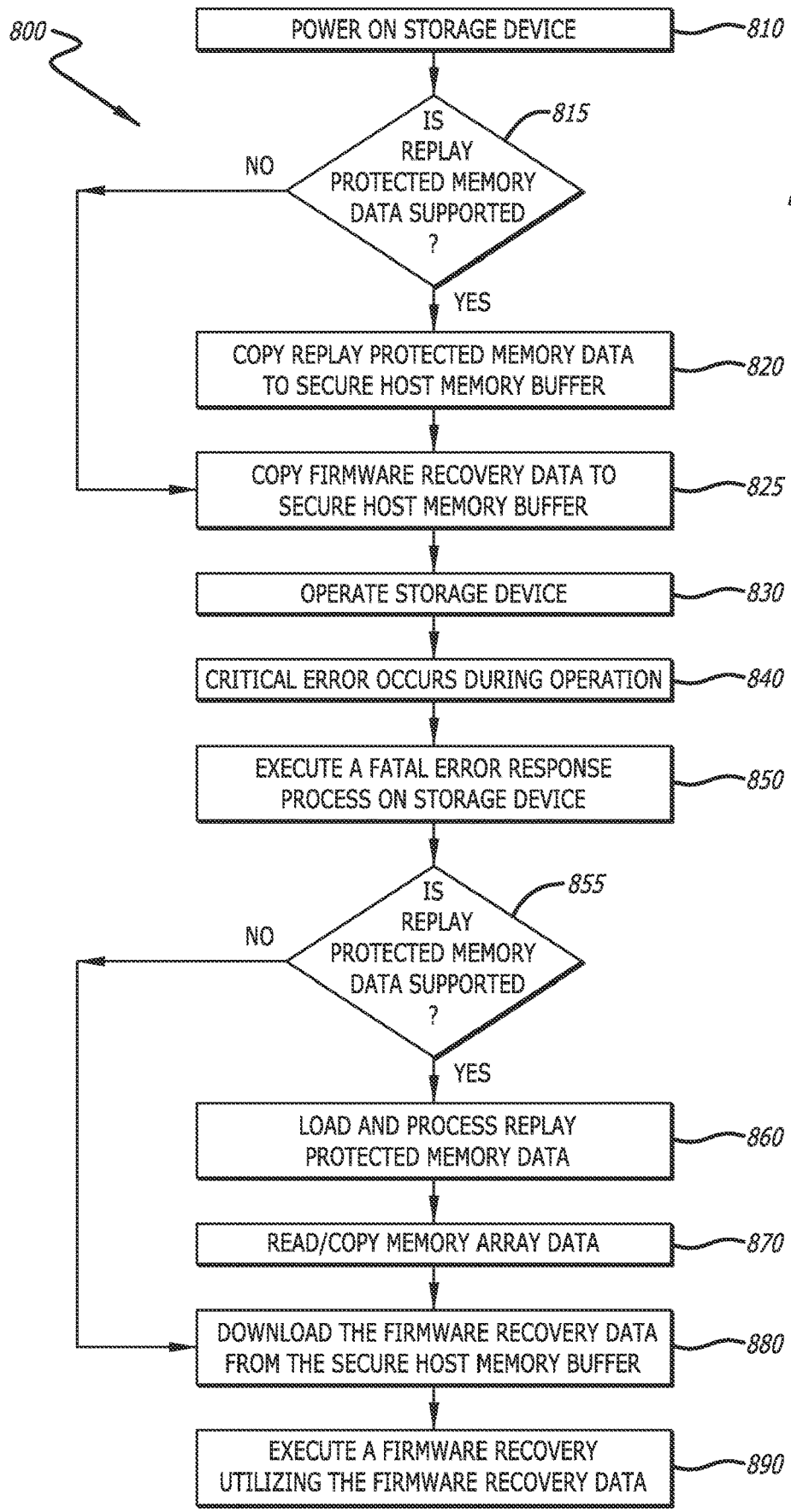

US 11,487,439 B1

UTILIZING HOST MEMORY BUFFERS FOR STORAGE DEVICE RECOVERIES

FIELD

The present disclosure relates to storage systems. More particularly, the present disclosure relates to storage devices utilizing a host memory buffer to store data configured to recover the storage device from a fatal error, thus reducing the need for manufacturer or third party interventions to continue operation.

BACKGROUND

Storage devices are ubiquitous within computing systems. Solid-state storage devices have become increasingly common. These nonvolatile storage devices can communicate and utilize various protocols including non-volatile memory express (NVMe), and peripheral component interconnect express (PCIe) to reduce processing overhead and increase efficiency.

Storage devices receive and process large numbers of requests from host-computing devices. During normal operation, a critical error may occur for various reasons including firmware bugs or other host command processing limitations. The critical error can sometimes trigger a fatal error process that ultimately renders the storage device inoperable to the host-computing device. To correct the fatal error and return the storage device to normal operation, the entire storage device needs to be removed and serviced by specialized external software or by a third-party. This recovery process is burdensome as it often requires disconnection from the host-computing system and sending the storage device off to be repaired, increasing the overall down time of the storage device.

BRIEF DESCRIPTION OF DRAWINGS

The above, and other, aspects, features, and advantages of several embodiments of the present disclosure will be more apparent from the following description as presented in conjunction with the following several figures of the drawings.

FIG. 8 is a flowchart depicting a process for recovering a storage device utilizing both replay protected memory data and firmware recovery data to retain user data in accordance with an embodiment of the disclosure.

Figure 1:
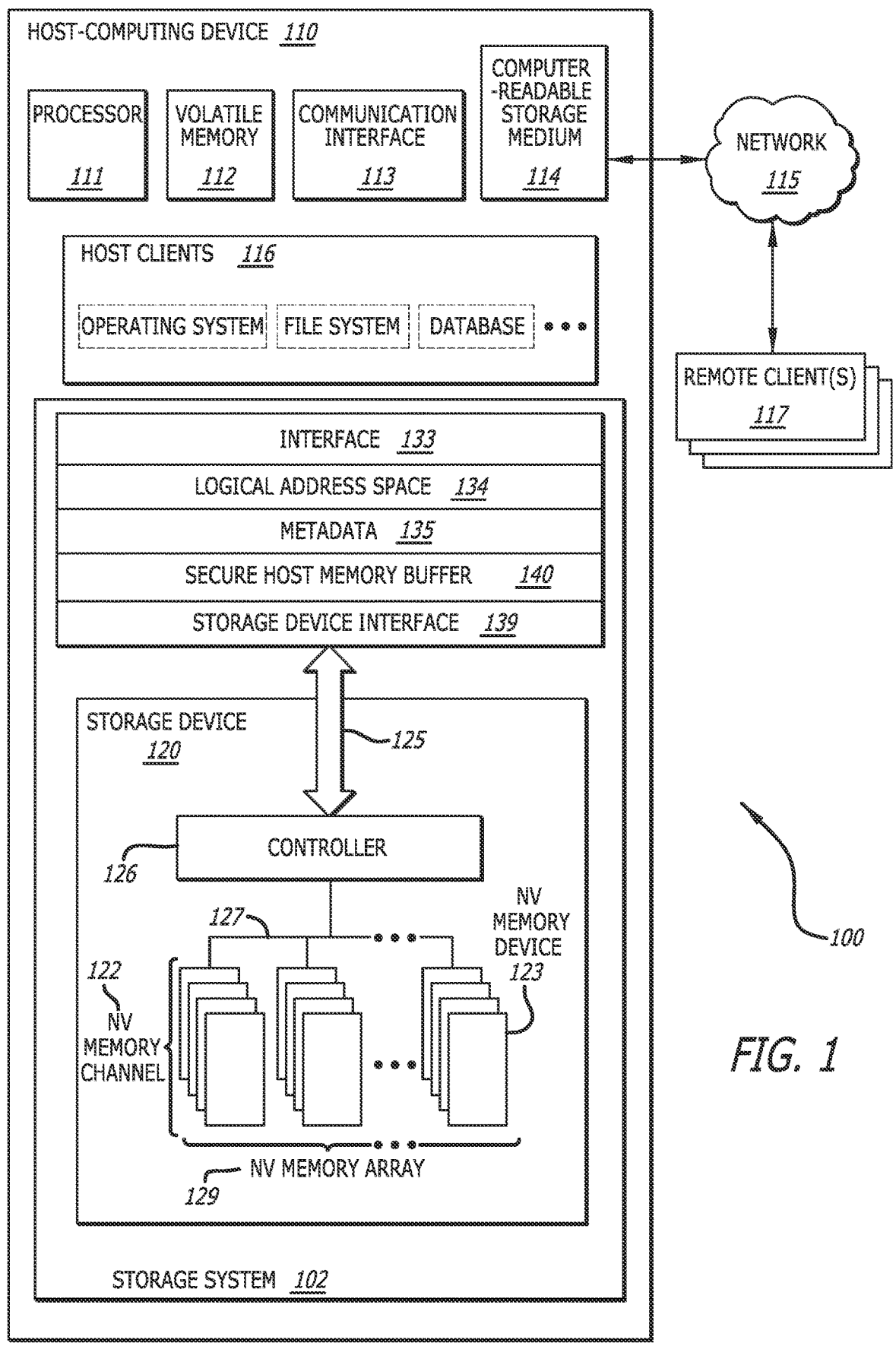
FIG. 1 is schematic block diagram of a host-computing device with a storage device suitable for storage device recovery in accordance with an embodiment of the disclosure.

Corresponding reference characters indicate corresponding components throughout the several figures of the drawings. Elements in the several figures are illustrated for simplicity and clarity and have not necessarily been drawn to scale. For example, the dimensions of some of the elements in the figures might be emphasized relative to other elements for facilitating understanding of the various presently disclosed embodiments. In addition, common, but well-understood, elements that are useful or necessary in a commercially feasible embodiment are often not depicted in order to facilitate a less obstructed view of these various embodiments of the present disclosure.

DETAILED DESCRIPTION

In response to the problems described above, devices and methods are discussed herein utilize a host memory buffer to facilitate direct recovery of storage devices in response to a fatal error response occurring. In many embodiments, specialized replay protected memory data and/or firmware recovery data can be stored within a host-side memory buffer. This data can be made available to the storage device after experiencing a critical error and/or fatal error process response. Thus, a storage device that would otherwise be rendered inoperable without external hardware or software intervention, can be configured to be automatically repaired via accessing the data stored within the host memory buffer.

In a number of embodiments, the replay protected memory data can be written to the host memory buffer upon each power cycle start of the storage device. The replay protected memory data can comprise a variety of data but may specifically include a plurality of boot data related to each partition within the storage device. The boot data can be utilized to access internal file system data which may then allow for loading of various mapping tables within the storage device which will oftentimes provide full operational access to the storage device. In some embodiments, the replay protected memory data can be hundreds of megabytes in size but can be reduced to a small size for host memory buffer storage in the order of kilobytes. In certain embodiments, the critical information utilized within the replay protected memory data to be stored in a host memory buffer can be less than one-hundred kilobytes in size.

In more embodiments, firmware recovery data can be written to the host memory buffer upon each update of the firmware. Specifically, the writing of the firmware recovery data can be configured to be part of the firmware update process. The firmware recovery data can be utilized to reinstall critical aspects of the firmware that can restore operation to the storage device. A drawback of this method is that it renders all previously stored host data on the storage device lost. However, various embodiments may first utilize replay protected recovery data to render the storage device readable which can allow opportunities to read and/or copy stored host data from the storage device before performing a firmware recovery process. The size of firmware recovery data is often in the megabyte size range, so requires more space within a host memory buffer. Therefore, if host memory buffer space is limited, some embodiments may be configured to only store replay protected data and not firmware recovery data.

In various embodiments, secure host memory buffers may be utilized in order to reduce any security threats or tampering of the replay protected memory data and/or firmware recovery data. The host-computing device may also be configured to enable or disable either of these recovery features based on the available space, desired security, etc. However, in many embodiments, the storage device can be configured to automatically utilize available data within a host memory buffer to recover the storage device to an operational state. Indeed, certain embodiments may be configured to perform these operations without interrupting or halting host computing operations.

Aspects of the present disclosure may be embodied as an apparatus, system, method, or computer program product. Accordingly, aspects of the present disclosure may take the form of an entirely hardware embodiment, an entirely software embodiment (including firmware, resident software, micro-code, or the like) or an embodiment combining software and hardware aspects that may all generally be referred to herein as a "function," "module," "apparatus," or "system." Furthermore, aspects of the present disclosure may take the form of a computer program product embodied in one or more non-transitory computer-readable storage media storing computer-readable and/or executable program code. Many of the functional units described in this specification have been labeled as functions, in order to emphasize their implementation independence more particularly. For example, a function may be implemented as a hardware circuit comprising custom VLSI circuits or gate arrays, off-the-shelf semiconductors such as logic chips, transistors, or other discrete components. A function may also be implemented in programmable hardware devices such as via field programmable gate arrays, programmable array logic, programmable logic devices, or the like.

Functions may also be implemented at least partially in software for execution by various types of processors. An identified function of executable code may, for instance, comprise one or more physical or logical blocks of computer instructions that may, for instance, be organized as an object, procedure, or function. Nevertheless, the executables of an identified function need not be physically located together but may comprise disparate instructions stored in different locations which, when joined logically together, comprise the function and achieve the stated purpose for the function.

Indeed, a function of executable code may include a single instruction, or many instructions, and may even be distributed over several different code segments, among different programs, across several storage devices, or the like. Where a function or portions of a function are implemented in software, the software portions may be stored on one or more computer-readable and/or executable storage media. Any combination of one or more computer-readable storage media may be utilized. A computer-readable storage medium may include, for example, but not limited to, an electronic, magnetic, optical, electromagnetic, infrared, or semiconductor system, apparatus, or device, or any suitable combination of the foregoing, but would not include propagating signals. In the context of this document, a computer readable and/or executable storage medium may be any tangible and/or non-transitory medium that may contain or store a program for use by or in connection with an instruction execution system, apparatus, processor, or device.

Computer program code for carrying out operations for aspects of the present disclosure may be written in any combination of one or more programming languages, including an object-oriented programming language such as Python, Java, Smalltalk, C++, C#, Objective C, or the like, conventional procedural programming languages, such as the "C" programming language, scripting programming languages, and/or other similar programming languages. The program code may execute partly or entirely on one or more of a user's computer and/or on a remote computer or server over a data network or the like.

A component, as used herein, comprises a tangible, physical, non-transitory device. For example, a component may be implemented as a hardware logic circuit comprising custom VLSI circuits, gate arrays, or other integrated circuits; off-the-shelf semiconductors such as logic chips, transistors, or other discrete devices; and/or other mechanical or electrical devices. A component may also be implemented in programmable hardware devices such as field programmable gate arrays, programmable array logic, programmable logic devices, or the like. A component may comprise one or more silicon integrated circuit devices (e.g., chips, die, die planes, packages) or other discrete electrical devices, in electrical communication with one or more other components through electrical lines of a printed circuit board (PCB) or the like. Each of the functions and/or modules described herein, in certain embodiments, may alternatively be embodied by or implemented as a component.

A circuit, as used herein, comprises a set of one or more electrical and/or electronic components providing one or more pathways for electrical current. In certain embodiments, a circuit may include a return pathway for electrical current, so that the circuit is a closed loop. In another embodiment, however, a set of components that does not include a return pathway for electrical current may be referred to as a circuit (e.g., an open loop). For example, an integrated circuit may be referred to as a circuit regardless of whether the integrated circuit is coupled to ground (as a return pathway for electrical current) or not. In various embodiments, a circuit may include a portion of an integrated circuit, an integrated circuit, a set of integrated circuits, a set of non-integrated electrical and/or electrical components with or without integrated circuit devices, or the like. In one embodiment, a circuit may include custom VLSI circuits, gate arrays, logic circuits, or other integrated circuits; off-the-shelf semiconductors such as logic chips, transistors, or other discrete devices; and/or other mechanical or electrical devices. A circuit may also be implemented as a synthesized circuit in a programmable hardware device such as field programmable gate array, programmable array logic, programmable logic device, or the like (e.g., as firmware, a netlist, or the like). A circuit may comprise one or more silicon integrated circuit devices (e.g., chips, die, die planes, packages) or other discrete electrical devices, in electrical communication with one or more other components through electrical lines of a printed circuit board (PCB) or the like. Each of the functions and/or modules described herein, in certain embodiments, may be embodied by or implemented as a circuit.

Reference throughout this specification to "one embodiment," "an embodiment," or similar language means that a particular feature, structure, or characteristic described in connection with the embodiment is included in at least one embodiment of the present disclosure. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising,"

"having," and variations thereof mean "including but not limited to", unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise.

Further, as used herein, reference to reading, writing, storing, buffering, and/or transferring data can include the entirety of the data, a portion of the data, a set of the data, and/or a subset of the data. Likewise, reference to reading, writing, storing, buffering, and/or transferring non-host data can include the entirety of the non-host data, a portion of the non-host data, a set of the non-host data, and/or a subset of the non-host data.

Lastly, the terms "or" and "and/or" as used herein are to be interpreted as inclusive or meaning any one or any combination. Therefore, "A, B or C" or "A, B and/or C" mean "any of the following: A; B; C; A and B; A and C; B and C; A, B and C." An exception to this definition will occur only when a combination of elements, functions, steps, or acts are in some way inherently mutually exclusive.

Aspects of the present disclosure are described below with reference to schematic flowchart diagrams and/or schematic block diagrams of methods, apparatuses, systems, and computer program products according to embodiments of the disclosure. It will be understood that each block of the schematic flowchart diagrams and/or schematic block diagrams, and combinations of blocks in the schematic flowchart diagrams and/or schematic block diagrams, can be implemented by computer program instructions. These computer program instructions may be provided to a processor of a computer or other programmable data processing apparatus to produce a machine, such that the instructions, which execute via the processor or other programmable data processing apparatus, create means for implementing the functions and/or acts specified in the schematic flowchart diagrams and/or schematic block diagrams block or blocks.

It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated figures. Although various arrow types and line types may be employed in the flowchart and/or block diagrams, they are understood not to limit the scope of the corresponding embodiments. For instance, an arrow may indicate a waiting or monitoring period of unspecified duration between enumerated steps of the depicted embodiment.

In the following detailed description, reference is made to the accompanying drawings, which form a part thereof. The foregoing summary is illustrative only and is not intended to be in any way limiting. In addition to the illustrative aspects, embodiments, and features described above, further aspects, embodiments, and features will become apparent by reference to the drawings and the following detailed description. The description of elements in each figure may refer to elements of proceeding figures. Like numbers may refer to like elements in the figures, including alternate embodiments of like elements.

Referring to FIG. 1, a schematic block diagram of a host-computing device 110 with a storage system 102 suitable for storage device recovery in accordance with an embodiment of the disclosure is shown. The control block management system 100 comprises one or more storage devices 120 of a storage system 102 within a host-computing device 110 in communication via a controller 126. The host-computing device 110 may include a processor 111, volatile memory 112, and a communication interface 113. The processor 111 may include one or more central processing units, one or more general-purpose processors, one or more application-specific processors, one or more virtual processors (e.g., the host-computing device 110 may be a virtual machine operating within a host), one or more processor cores, or the like. The communication interface 113 may include one or more network interfaces configured to communicatively couple the host-computing device 110 and/or controller 126 of the storage device 120 to a communication network 115, such as an Internet Protocol (IP) network, a Storage Area Network (SAN), wireless network, wired network, or the like.

The storage device 120, in various embodiments, may be disposed in one or more different locations relative to the host-computing device 110. In one embodiment, the storage device 120 comprises one or more non-volatile memory devices 123, such as semiconductor chips or packages or other integrated circuit devices disposed on one or more printed circuit boards, storage housings, and/or other mechanical and/or electrical support structures. For example, the storage device 120 may comprise one or more direct inline memory module (DIMM) cards, one or more expansion cards and/or daughter cards, a solid-state-drive (SSD) or other hard drive device, and/or may have another memory and/or storage form factor. The storage device 120 may be integrated with and/or mounted on a motherboard of the host-computing device 110, installed in a port and/or slot of the host-computing device 110, installed on a different host-computing device 110 and/or a dedicated storage appliance on the network 115, in communication with the host-computing device 110 over an external bus (e.g., an external hard drive), or the like.

The storage device 120, in one embodiment, may be disposed on a memory bus of a processor 111 (e.g., on the same memory bus as the volatile memory 112, on a different memory bus from the volatile memory 112, in place of the volatile memory 112, or the like). In a further embodiment, the storage device 120 may be disposed on a peripheral bus of the host-computing device 110, such as a peripheral component interconnect express (PCI Express or PCIe) bus such, as but not limited to a NVM Express (NVMe) interface, a serial Advanced Technology Attachment (SATA) bus, a parallel Advanced Technology Attachment (PATA) bus, a small computer system interface (SCSI) bus, a FireWire bus, a Fibre Channel connection, a Universal Serial Bus (USB), a PCIe Advanced Switching (PCIe-AS) bus, or the like. In another embodiment, the storage device 120 may be disposed on a communication network 115, such as an Ethernet network, an Infiniband network, SCSI RDMA over a network 115, a storage area network (SAN), a local area network (LAN), a wide area network (WAN) such as the Internet, another wired and/or wireless network 115, or the like.

The host-computing device 110 may further comprise computer-readable storage medium 114. The computer-readable storage medium 114 may comprise executable instructions configured to cause the host-computing device 110 (e.g., processor 111) to perform steps of one or more of the methods disclosed herein. Additionally, or in the alternative, a buffering component may be embodied as one or more computer-readable instructions stored on the computer-readable storage medium 114.

A device driver and/or the controller 126, in certain embodiments, may present a logical address space 134 to the host clients 116. As used herein, a logical address space 134 refers to a logical representation of memory resources. The logical address space 134 may comprise a plurality (e.g., range) of logical addresses. As used herein, a logical address refers to any identifier for referencing a memory resource (e.g., data), including, but not limited to: a logical block address (LBA), cylinder/head/sector (CHS) address, a file name, an object identifier, an inode, a Universally Unique Identifier (UUID), a Globally Unique Identifier (GUID), a hash code, a signature, an index entry, a range, an extent, or the like.

A device driver for the storage device 120 may maintain metadata 135, such as a logical to physical address mapping structure, to map logical addresses of the logical address space 134 to media storage locations on the storage device(s) 120. A device driver may be configured to provide storage services to one or more host clients 116. The host clients 116 may include local clients operating on the host-computing device 110 and/or remote clients 117 accessible via the network 115 and/or communication interface 113. The host clients 116 may include, but are not limited to: operating systems, file systems, database applications, server applications, kernel-level processes, user-level processes, applications, and the like.

In many embodiments, the host-computing device 110 can include a plurality of virtual machines which may be instantiated or otherwise created based on user-request. As will be understood by those skilled in the art, a host-computing device 110 may create a plurality of virtual machines configured as virtual hosts which is limited only on the available computing resources and/or demand. A hypervisor can be available to create, run, and otherwise manage the plurality of virtual machines. Each virtual machine may include a plurality of virtual host clients similar to host clients 116 that may utilize the storage system 102 to store and access data.

The device driver may be further communicatively coupled to one or more storage systems 102 which may include different types and configurations of storage devices 120 including, but not limited to: solid-state storage devices, semiconductor storage devices, SAN storage resources, or the like. The one or more storage devices 120 may comprise one or more respective controllers 126 and non-volatile memory channels 122. The device driver may provide access to the one or more storage devices 120 via any compatible protocols or interface 133 such as, but not limited to, SATA and PCIe. The metadata 135 may be used to manage and/or track data operations performed through the protocols or interfaces 133. The logical address space 134 may comprise a plurality of logical addresses, each corresponding to respective media locations of the one or more storage devices 120. The device driver may maintain metadata 135 comprising any-to-any mappings between logical addresses and media locations.

A device driver may further comprise and/or be in communication with a storage device interface 139 configured to transfer data, commands, and/or queries to the one or more storage devices 120 over a bus 125, which may include, but is not limited to: a memory bus of a processor 111, a peripheral component interconnect express (PCI Express or PCIe) bus, a serial Advanced Technology Attachment (ATA) bus, a parallel ATA bus, a small computer system interface (SCSI), FireWire, Fibre Channel, a Universal Serial Bus (USB), a PCIe Advanced Switching (PCIe-AS) bus, a network 115, Infiniband, SCSI RDMA, or the like. The storage device interface 139 may communicate with the one or more storage devices 120 using input-output control (IO-CTL) command(s), IO-CTL command extension(s), remote direct memory access, or the like.

The storage system 102 may further include a secure host memory buffer 140. The secure host memory buffer 140 may be configured to receive and store data from a storage device 120. In this way, the secure host memory buffer 140 can be configured as an external memory storage for the storage device 120 which can be utilized in the event the storage device encounters a fatal/critical error and becomes nonresponsive. In certain embodiments, the secure host memory buffer 140 may be configured as a regular, non-secure memory buffer. In still further embodiments, the secure host memory buffer 140 may be stored outside of the storage system 102 and may be located within a different part of the host-computing device 110. In still yet further embodiments, the secure host memory buffer 140 may be located remotely as part of one or more remote clients 117.

The communication interface 113 may comprise one or more network interfaces configured to communicatively couple the host-computing device 110 and/or the controller 126 to a network 115 and/or to one or more remote clients 117 (which can act as another host). The controller 126 is part of and/or in communication with one or more storage devices 120. Although FIG. 1 depicts a single storage device 120, the disclosure is not limited in this regard and could be adapted to incorporate any number of storage devices 120.

The storage device 120 may comprise one or more non-volatile memory devices 123 of non-volatile memory channels 122, which may include but is not limited to: ReRAM, Memristor memory, programmable metallization cell memory, phase-change memory (PCM, PCME, PRAM, PCRAM, ovonic unified memory, chalcogenide RAM, or C-RAM), NAND flash memory (e.g., 2D NAND flash memory, 3D NAND flash memory), NOR flash memory, nano random access memory (nano RAM or NRAM), nanocrystal wire-based memory, silicon-oxide based sub-10 nanometer process memory, graphene memory, Silicon Oxide-Nitride-Oxide-Silicon (SONOS), programmable metallization cell (PMC), conductive-bridging RAM (CBRAM), magneto-resistive RAM (MRAM), magnetic storage media (e.g., hard disk, tape), optical storage media, or the like. The one or more non-volatile memory devices 123 of the non-volatile memory channels 122, in certain embodiments, comprise storage class memory (SCM) (e.g., write in place memory, or the like).

While the non-volatile memory channels 122 is referred to herein as "memory media," in various embodiments, the non-volatile memory channels 122 may more generally comprise one or more non-volatile recording media capable of recording data, which may be referred to as a non-volatile memory medium, a non-volatile memory device, or the like. Further, the storage device 120, in various embodiments, may comprise a non-volatile recording device, a non-volatile memory array 129, a plurality of interconnected storage devices in an array, or the like.

The non-volatile memory channels 122 may comprise one or more non-volatile memory devices 123, which may include, but are not limited to: chips, packages, planes, die, or the like. A controller 126 may be configured to manage data operations on the non-volatile memory channels 122, and may comprise one or more processors, programmable processors (e.g., FPGAs), ASICs, micro-controllers, or the like. In some embodiments, the controller 126 is configured to store data on and/or read data from the non-volatile memory channels 122, to transfer data to/from the storage device 120, and so on.

The controller 126 may be communicatively coupled to the non-volatile memory channels 122 by way of a bus 127. The bus 127 may comprise an I/O bus for communicating data to/from the non-volatile memory devices 123. The bus 127 may further comprise a control bus for communicating addressing and other command and control information to the non-volatile memory devices 123. In some embodiments, the bus 127 may communicatively couple the non-volatile memory devices 123 to the controller 126 in parallel. This parallel access may allow the non-volatile memory devices 123 to be managed as a group, forming a non-volatile memory array 129. The non-volatile memory devices 123 may be partitioned into respective logical memory units (e.g., logical pages) and/or logical memory divisions (e.g., logical blocks). The logical memory units may be formed by logically combining physical memory units of each of the non-volatile memory devices 123.

The controller 126 may organize a block of word lines within a non-volatile memory device 123, in certain embodiments, using addresses of the word lines, such that the word lines are logically organized into a monotonically increasing sequence (e.g., decoding and/or translating addresses for word lines into a monotonically increasing sequence, or the like). In a further embodiment, word lines of a block within a non-volatile memory device 123 may be physically arranged in a monotonically increasing sequence of word line addresses, with consecutively addressed word lines also being physically adjacent (e.g., WL0, WL1, WL2, . . . WLN).

The controller 126 may comprise and/or be in communication with a device driver executing on the host-computing device 110. A device driver may provide storage services to the host clients 116 via one or more interfaces 133. A device driver may further comprise a storage device interface 139 that is configured to transfer data, commands, and/or queries to the controller 126 over a bus 125, as described above.

Figure 2:
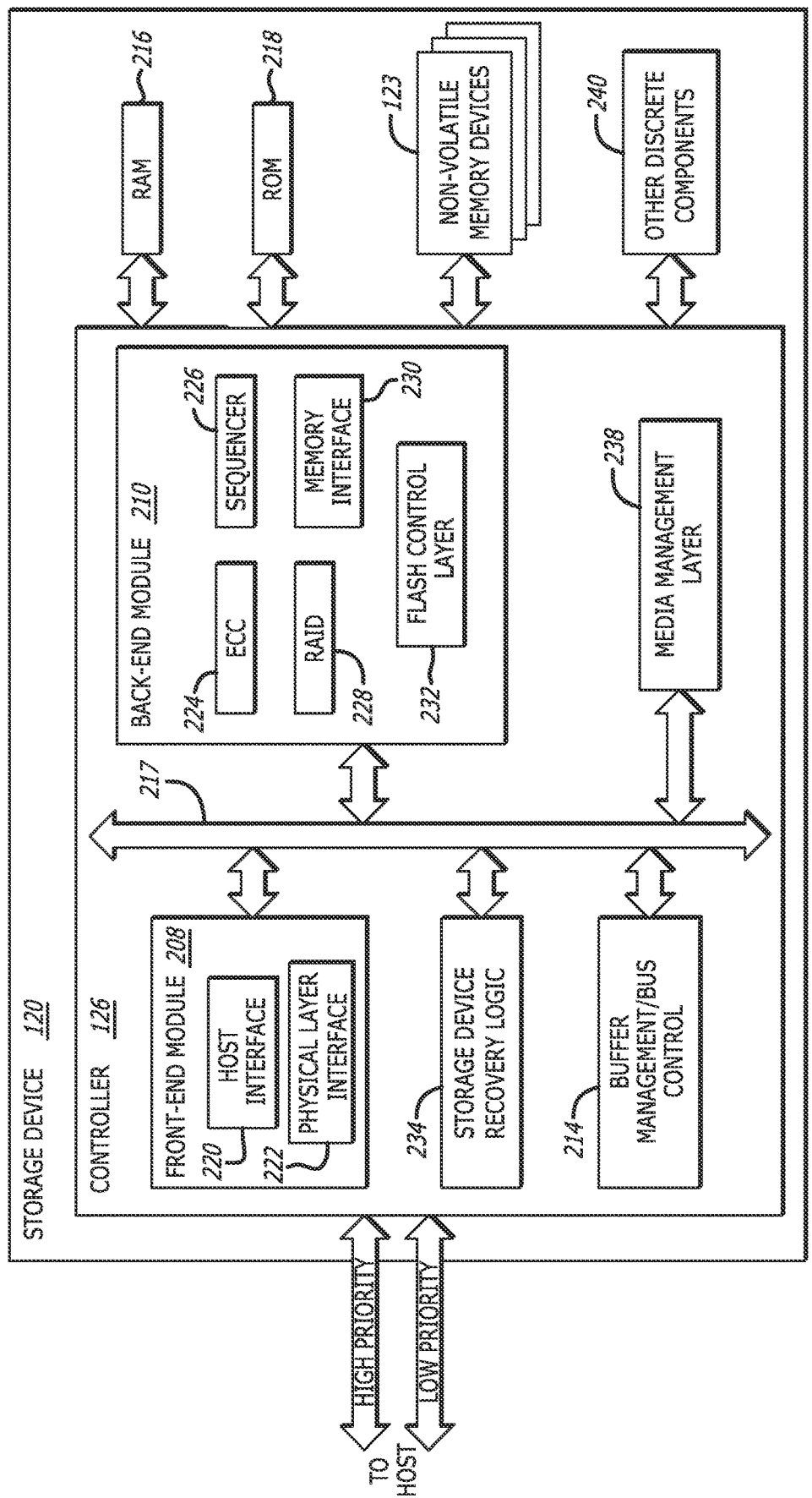
FIG. 2 is a schematic block diagram of a storage device suitable for storage device recovery in accordance with an embodiment of the disclosure.

Referring to FIG. 2, a schematic block diagram of a storage device 120 suitable for storage device recovery in accordance with an embodiment of the disclosure. The controller 126 may include a front-end module 208 that interfaces with a host via a plurality of high priority and low priority communication channels, a back-end module 210 that interfaces with the non-volatile memory devices 123, and various other modules that perform various functions of the storage device 120. In some examples, each module may just be the portion of the memory that comprises instructions executable with the processor to implement the features of the corresponding module without the module including any other hardware. Because each module includes at least some hardware even when the included hardware comprises software, each module may be interchangeably referred to as a hardware module.

The controller 126 may include a buffer management/bus control module 214 that manages buffers in random access memory (RAM) 216 and controls the internal bus arbitration for communication on an internal communications bus 217 of the controller 126. A read only memory (ROM) 218 may store and/or access system boot code. Although illustrated in FIG. 2 as located separately from the controller 126, in other embodiments one or both of the RAM 216 and the ROM 218 may be located within the controller 126. In yet other embodiments, portions of RAM 216 and ROM 218 may be located both within the controller 126 and/or outside the controller 126. Further, in some implementations, the controller 126, the RAM 216, and the ROM 218 may be located on separate semiconductor dies. As discussed below, in one implementation, the submission queues and the completion queues may be stored in a controller memory buffer, which may be housed in RAM 216.

Additionally, the front-end module 208 may include a host interface 220 and a physical layer interface 222 that provides the electrical interface with the host or next level storage controller. The choice of the type of the host interface 220 can depend on the type of memory being used. Examples types of the host interfaces 220 may include, but are not limited to, SATA, SATA Express, SAS, Fibre Channel, USB, PCIe, eMMC, UFS, and/or NVMe. The host interface 220 may typically facilitate transfer for data, control signals, and timing signals.

The back-end module 210 may include an error correction controller (ECC) engine 224 that encodes the data bytes received from the host and decodes and error corrects the data bytes read from the non-volatile memory devices 123. The back-end module 210 may also include a command sequencer 226 that generates command sequences, such as program, read, and erase command sequences, to be transmitted to the non-volatile memory devices 123. Additionally, the back-end module 210 may include a RAID (Redundant Array of Independent Drives) module 228 that manages generation of RAID parity and recovery of failed data. The RAID parity may be used as an additional level of integrity protection for the data being written into the storage device 120. In some cases, the RAID module 228 may be a part of the ECC engine 224. A memory interface 230 provides the command sequences to the non-volatile memory devices 123 and receives status information from the non-volatile memory devices 123. Along with the command sequences and status information, data to be programmed into and read from the non-volatile memory devices 123 may be communicated through the memory interface 230. A flash control layer 232 may control the overall operation of back-end module 210.

Additional modules of the storage device 120 illustrated in FIG. 2 may include a media management layer 238, which performs wear leveling of memory cells of the non-volatile memory devices 123. The storage device 120 may also include other discrete components 240, such as external electrical interfaces, external RAM, resistors, capacitors, or other components that may interface with controller 126. In alternative embodiments, one or more of the RAID modules 228, media management layer 238 and buffer management/bus control module 214 are optional components that may not be necessary in the controller 126.

Finally, the controller 126 may also comprise a storage device recovery logic 234. In many embodiments, the storage device recovery logic 234 can be configured to facilitate the generation and storage of recovery data within a host memory buffer, such as a secure host memory buffer 140 of FIG. 1. The recovery data generated may be replay protected recovery data, firmware recovery data, etc. In certain embodiments, recovery data, such as firmware recovery data, may be pre-generated and provided as part of a firmware update package. In still further embodiments, the firmware recovery data may be partially generated from provided pre-generated firmware recovery data from a firmware update package along with data specific to the storage device.

In some embodiments, the storage device recovery logic 234 may also facilitate the utilization and processing of replay protected memory data to generate or re-access internal file system data and/or mapping table data. In additional embodiments, the storage device recovery logic 234 can recognize opportune times to store recovery data within a host memory buffer, such as, but not limited to, storage device power on and/or firmware updating. The storage device recovery logic 234 may also be configured to facilitate storage and retrieval of recovery data within a secure host memory buffer should it be requested by the host.

Figure 3:
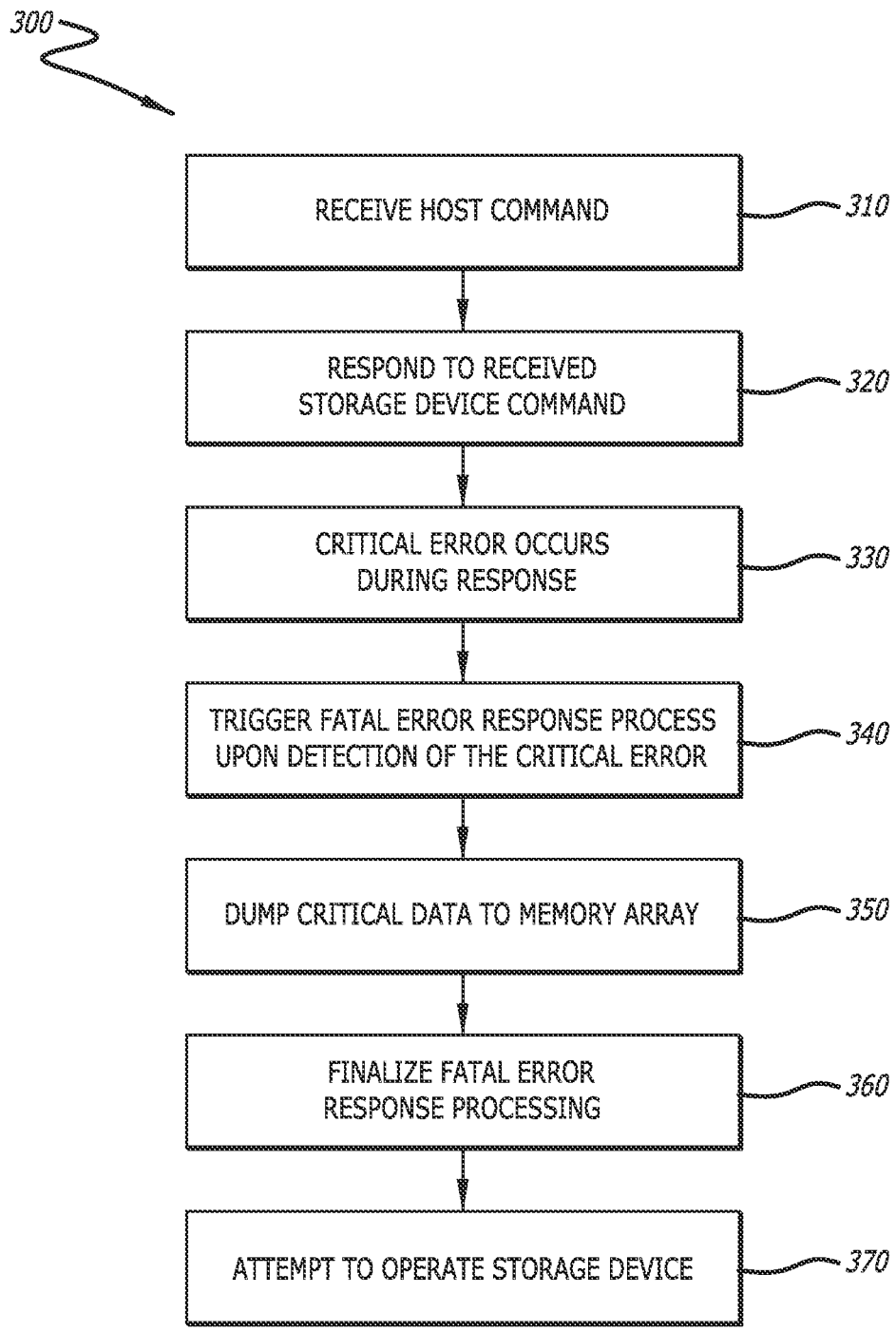
FIG. 3 is a flowchart depicting a process for responding to a fatal error in accordance with an embodiment of the disclosure.

Referring to FIG. 3, a flowchart depicting a process 300 for responding to a fatal error in accordance with an embodiment of the disclosure is shown. Storage devices are often configured to receive and process large numbers of host commands. During the processing of these commands, one or more of them may lead to a fatal error (i.e., a "fatal assert") or other error which halts at least some progress of operations within the storage device. The fatal error may be triggered through execution of a critical error which may be caused by the received commands, or through the operations related to executing the received commands. In many embodiments, the storage device can be configured to handle these fatal errors in a prescribed method.

The process 300 can occur as a result of the storage device receiving a plurality of host commands (block 310). The storage device can respond to these received host commands (block 320). During the execution of these host commands, at least one of them may cause a critical error to occur (block 330). A critical error may occur in a variety of ways including, but not limited to, a corruption occurring within a critical mapping table, a translation error, a hardware error, or other events that trigger an error. Through the detection, execution and/or processing of a critical error, the process 300 can trigger a fatal error response process (block 340).

In a number of embodiments, the fatal error response process can initially dump critical data to the memory array (block 350). The type of critical data dumped can be related to the type of critical error detected or may be a predetermined set of data that will be dumped in every scenario. Once dumped, the process 300 can finalize the fatal error response processing (block 360). These final processes can include copying, erasing, or restoring data related to the critical error. Once finalized, the process 300 can attempt to operate the storage device again (block 370). In some embodiments, certain critical errors and associated fatal error processing can render a storage device inoperable upon reboot of the device. Many embodiments described below process fatal errors utilizing data stored within a host memory buffer that can avoid a storage device being inoperable post handling.

Figure 4:
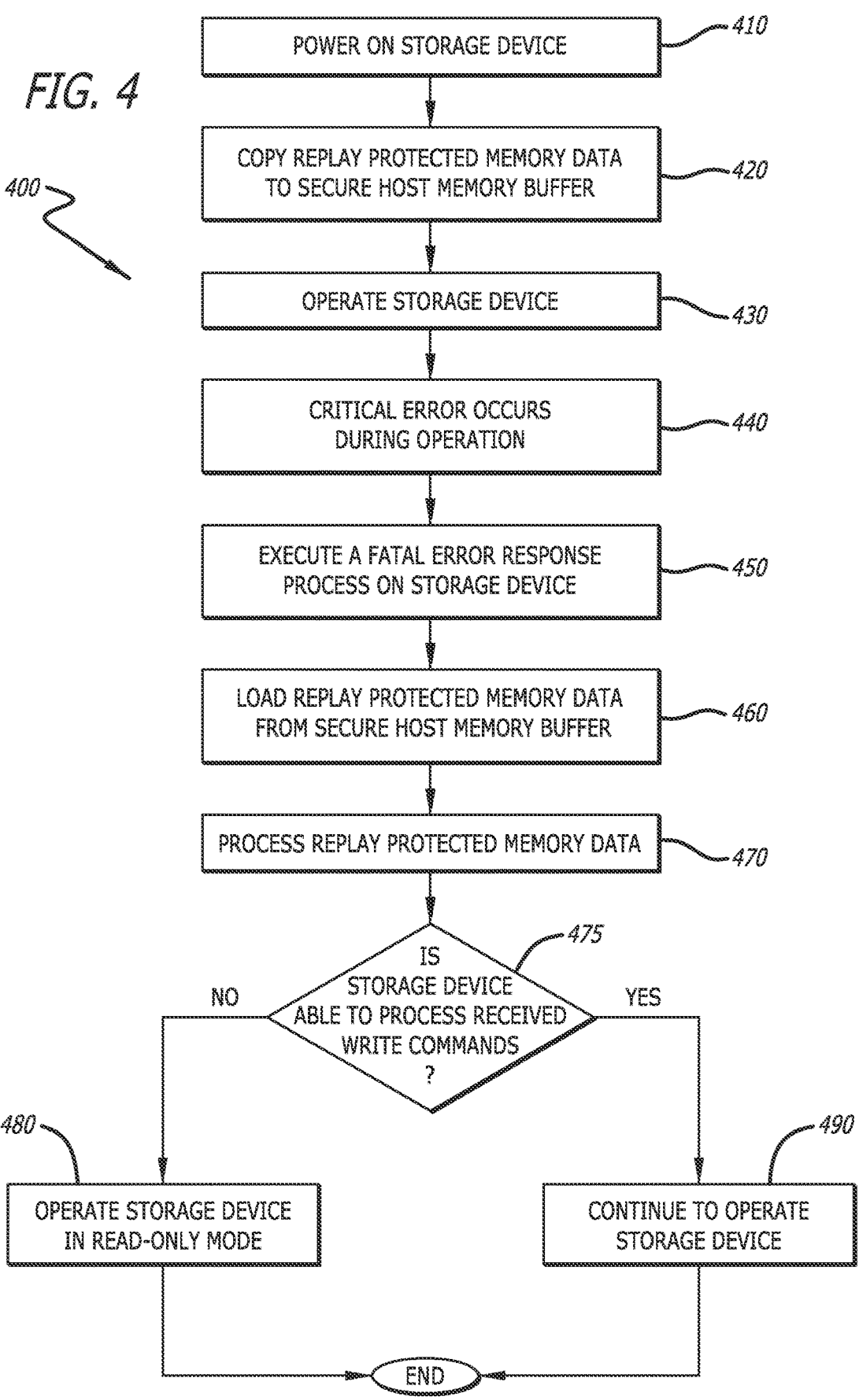
FIG. 4 is a flowchart depicting a process for recovering a storage device utilizing replay protected memory data stored within a host memory buffer in accordance with an embodiment of the disclosure.

Referring to FIG. 4, a flowchart depicting a process 400 for recovering a storage device utilizing replay protected memory data stored within a host memory buffer in accordance with an embodiment of the disclosure is shown. The process 400 can begin by powering on the storage device (block 410). In certain embodiments, this process 400 will occur upon each time the storage device is powered on. In further embodiments, the process 400 will occur on an initial powering on but will not occur until a fixed number of power cycles. Once the storage device has been powered on, the process 400 can copy critical data from the replay protected memory data to a secure host memory buffer (block 420).

In various embodiments, replay protected memory data can include boot information which in many embodiments includes internal file system data that is associated with the storage device. In additional embodiments, the storage device may include a plurality of partitions which may themselves utilize unique partition boot information data. The partition boot information, as described in more detail below in the discussion of FIG. 5, may be utilized to recover internal file system data which can then also be utilized to recover various mapping tables. By accessing particular portions of the replay protected memory data, the contents of the storage device may be recovered/rebuilt and become accessible again.

Upon completion of the copying of the replay protected memory data, operation of the storage device may commence and/or continuer (block 430). During operation, a critical error can occur (block 440). The critical error can then trigger a fatal error, leading to the execution of a fatal error response process on the storage device (block 450). In many embodiments, the fatal error response process is similar to the process 300 described in FIG. 3. Upon completion of the fatal error response process, the replay protected memory data can be loaded from the secure host memory buffer (block 460). In certain embodiments, the loading of the replay protected memory data can occur during the execution of the fatal error response process.

Once loaded, the replay protected memory data can be processed to recover the storage device (block 470). Because fatal errors can be caused by a variety of factors, and can vary greatly in size and scope, the state of the storage device after an initial recovery may be variable. Thus, the process 400 can determine if the storage device is able to process subsequently received write commands from the host (block 475). If the storage device is able to properly process write commands, normal operation of the storage device can continue (block 490). When the storage device is not able to properly process data write commands, the storage device can switch to operate in a read-only mode (block 480). In a number of embodiments, the storage device will notify the host computing device of this mode change, which can provide an opportunity to copy all necessary host data off of the storage device prior to further recovery efforts. This is in contrast to traditional recovery methods which will render the storage device inoperable without manufacturer or third party intervention, but also renders the host data stored within the memory array lost and inaccessible.

Figure 5:
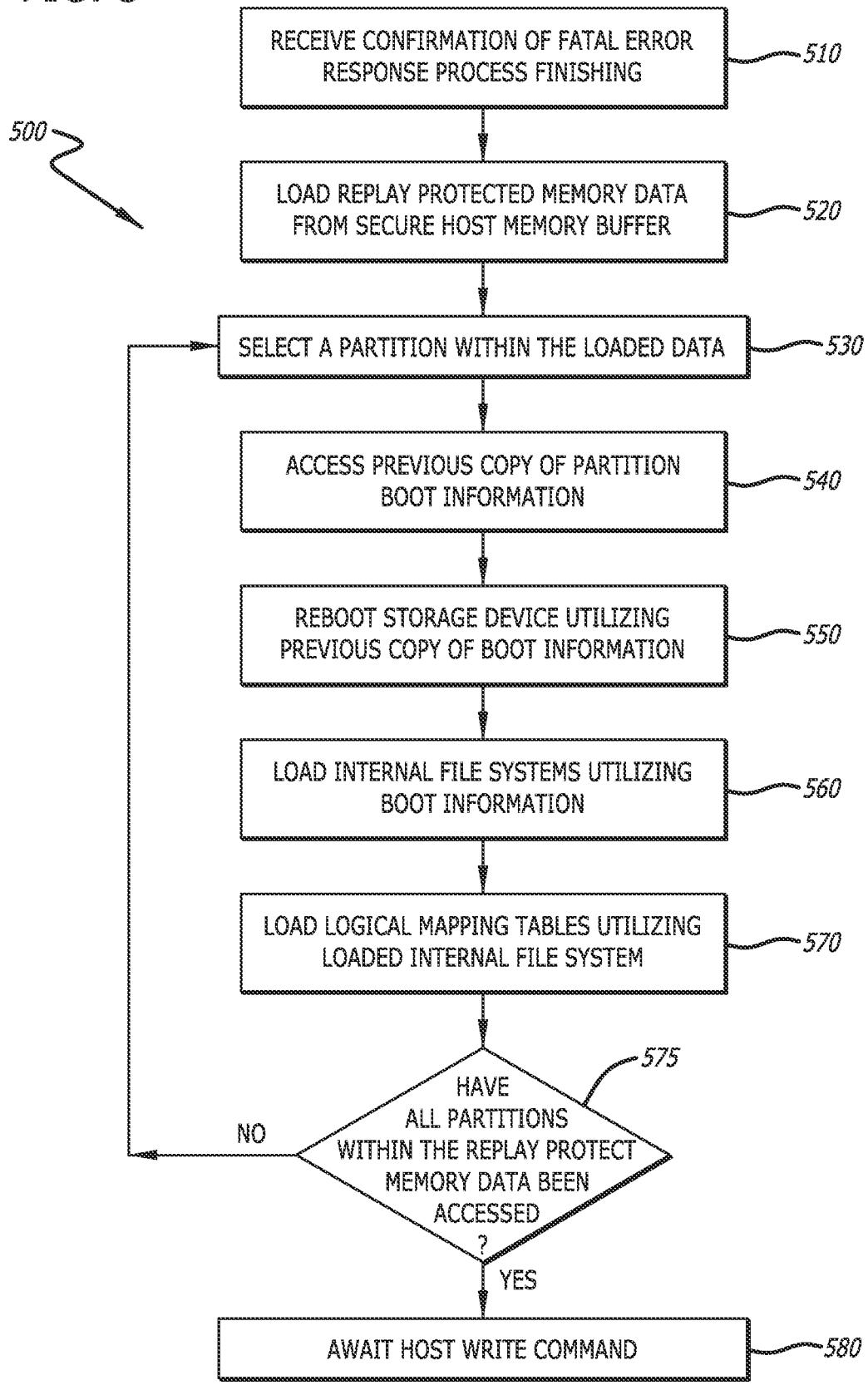
FIG. 5 is a flowchart depicting a process for utilizing replay protected memory data to restore storage device partitions in accordance with an embodiment of the disclosure.

Referring to FIG. 5, a flowchart depicting a process 500 for utilizing replay protected memory data to restore storage device partitions in accordance with an embodiment of the disclosure is shown. The process 500 can begin upon receipt of a confirmation of a fatal error response process finishing (block 510). In a number of embodiments, the replay protected memory data can then be loaded from a secure host memory buffer (block 520). In some embodiments, the host memory buffer may not be secure and can be any available external memory buffer accessible by the storage device.

As described above, the storage device may include a number of partitions. The process 500 can operate by working on a partition-by-partition basis. In a number of embodiments, the process 500 selects an unprocessed partition within the loaded data (block 530). Each partition within the replay protected memory data can have data associated with it, including boot information. The process 500 can access a previous copy of the partition boot information (block 540). Once accessed, the storage device can be rebooted in certain embodiments (block 550). Once rebooted, an internal file system can be loaded (block 560). An internal file system can then allow further access and loading of one or more logical mapping tables (block 570). Upon this step, host data may then become accessible again after the critical error and fatal error process response.

The process 500 can then determine if all partitions within the replay protect memory data have been accessed (block 575). If more partitions have yet to be processed, another partition can be selected for processing (block 530). If all partitions have been processed, the storage device can then await a host write command to determine if it can properly process those commands (block 580). Although various embodiments described above utilize host memory buffers to store replay protected memory data, the embodiments described below include the storage of firmware recovery data within the host memory buffers to facilitate storage device recovery.

Figure 6:
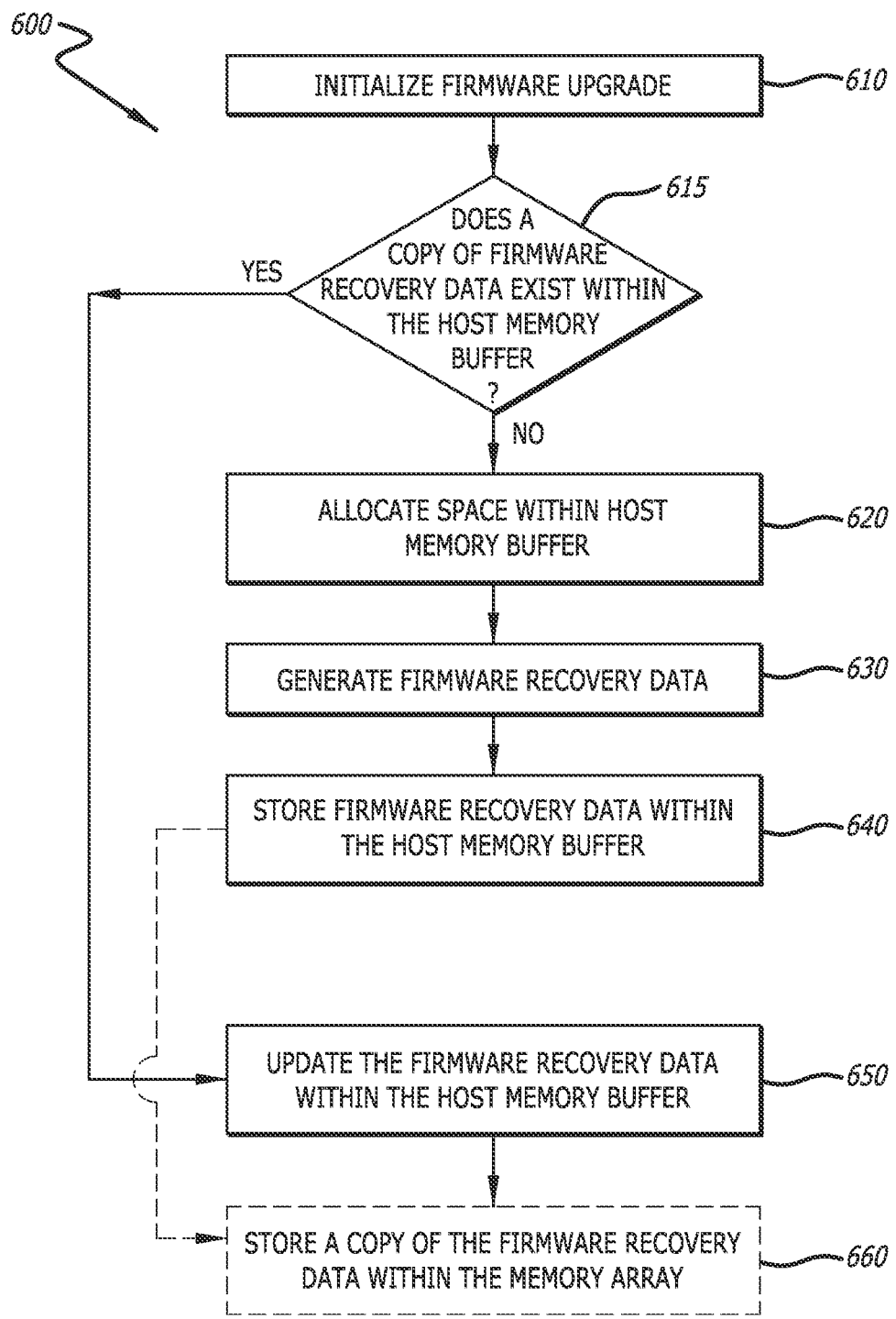
FIG. 6 is a flowchart depicting a process for generating firmware recovery data configured for storage within a host memory buffer in accordance with an embodiment of the disclosure.

Referring to FIG. 6, a flowchart depicting a process 600 for generating firmware recovery data configured for storage within a host memory buffer in accordance with an embodiment of the disclosure is shown. Prior to usage in recovery processes, firmware recovery data can be generated and stored within a host memory buffer. In many embodiments, the process 600 can occur when the firmware within the storage device is being installed and/or updated. Thus, the process 600 can begin upon initialization of a firmware upgrade (block 610).

In certain instances, the host memory buffer may already have a copy of firmware recovery data. In other instances, no firmware recovery data is present. Thus, the process 600 can determine if a copy of the firmware recovery data exists within a host memory buffer (block 615). When firmware recovery already exists, there may not be a need to generate new firmware recovery data. This may require simply the updating of the firmware recovery data within the host memory buffer (block 650). If firmware recovery data does not already exist within a host memory buffer, allocation of the space within the host memory buffer can occur (block 620). In some embodiments, the firmware upgrade data may include pre-generated firmware recovery data. In further embodiments, the firmware recovery data can be generated within the storage device (block 630). Once generated, the firmware recovery data can be stored within the host memory buffer (block 640).

Upon storage or updating of the firmware recovery data, many embodiments may store a redundant copy of the firmware recovery data within the memory array of the storage device (block 660). In certain scenarios, it may be beneficial to have an internal copy of the firmware recovery data as read-only access may still be utilized after a recovery attempt (e.g., as seen in the process 400 of FIG. 4 above). Although beneficial, certain embodiments may not require the firmware recovery data to be stored within the memory array. The stored firmware recovery data may then later be utilized during a recovery process, including the processes 700, 800 described below in relation to FIGS. 7 and 8.

Figure 7:
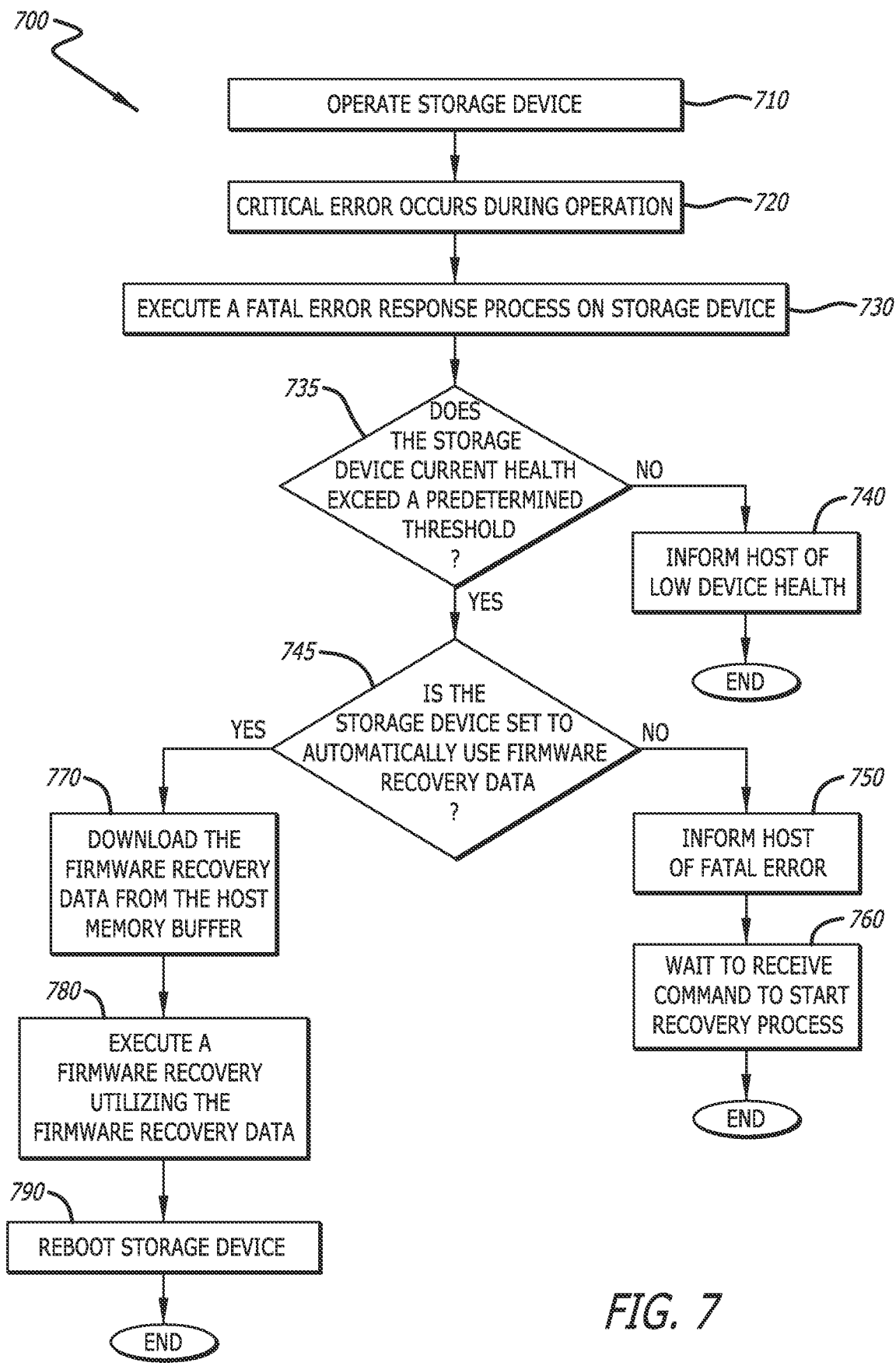
FIG. 7 is a flowchart depicting a process for recovering a storage device utilizing firmware recovery data stored within a host memory buffer in accordance with an embodiment of the disclosure.

Referring to FIG. 7, a flowchart depicting a process 700 for recovering a storage device utilizing firmware recovery data stored within a host memory buffer in accordance with an embodiment of the disclosure is shown. In many embodiments, a storage device can be in communication with a host computing device which has firmware recovery data previously stored in a host memory buffer. This firmware recovery data may have been copied to the host memory buffer during a process similar to the process 600 depicted in FIG. 6.

The process 700 can occur when a storage device is being operated normally (block 710). During some point in the operation of the storage device, a critical error can occur (block 720). In response to a critical error occurring, a fatal error response process can be executed on the storage device (block 730). In a number of embodiments, the fatal error response process will be similar to the process 300 depicted in FIG. 3.

Upon completion of the fatal error response process, an evaluation of the current health of the storage device can be made and compared to one or more predetermined thresholds to see if any of the thresholds have been exceeded (block 735). The predetermined threshold can be an overall health score that can be computed from a plurality of individual states and/or values associated with storage device health. Although not exhaustive, storage device states and/or values may include, but are not limited to: overall composite temperature, spare memory devices, percentage of memory array used, number of data units read, number of host read and/or write commands, controller busy time, number of power cycles, number of power on hours, number of unsafe shutdowns, number of integrity errors, and/or the number of error log entries. Any of the preceding items and/or others may be utilized to generate an overall composite score that can be utilized as a threshold to judge overall storage device health and whether to continue the firmware recovery process via host memory buffer.

Depending on the configuration of the predetermined thresholds, it may be determined that the overall health of the storage device does not exceed a predetermined threshold representing a minimum level of required and/or desired health within the storage device. In many of these instances, the process 700 can inform the host of the low level of storage device health (block 740). The storage device can then be configured to not attempt any firmware recovery process on the storage device and end recovery efforts. In certain embodiments, this automatic ending of the recovery process can be overridden via a manual command received from the host.

If the storage device is determined to have an overall health level that exceeds the one or more predetermined thresholds, the process 700 can then determine if the storage device is set to automatically utilize the available firmware recovery data (block 745). In some embodiments, this may be determined by simply checking a state bit or flag within a location of a memory of the storage device. In certain embodiments, the storage device may be configured to not perform an automatic firmware recovery and may then instead inform the host computing device of the fatal error that was processed (block 750). Then, the storage device can wait to receive a command to start the recovery process manually (block 760).

In embodiments of the storage device that are configured to automatically utilize available firmware recovery data, the process 700 can download the firmware recovery data from the host memory buffer (block 770). In many embodiments, the host memory buffer will be a secure host memory buffer. The storage device can then execute a firmware recovery utilizing the downloaded firmware recovery data (block 780). Once the firmware recovery process has completed, the storage device can then be rebooted back to an operational state (block 790). As those skilled in the art will understand, utilizing a firmware recovery process will lead to a complete erasure of any host data that previously resided within the memory array of the storage device. Thus, automatic firmware recovery utilizing host memory buffers is not always a desired response. As discussed below in FIG. 8, a process may be utilized that incorporates aspects of utilizing a host memory buffer for replay protected memory data to recover host data in most cases and then (if needed) utilize firmware recovery data to restore full operation to the storage device after a fatal error process is triggered.

Referring to FIG. 8, a flowchart depicting a process 800 for recovering a storage device utilizing both replay protected memory data and firmware recovery data to retain user data in accordance with an embodiment of the disclosure is shown. Similar to other processes discussed above, the process 800 can begin upon powering on of the storage device (block 810). The storage device can determine if the use of replay protected memory data is supported (block 815). If replay protected memory data is supported, it can be copied to a secure host memory buffer (block 820). Additionally, firmware recovery data can also be copied to a secure host memory buffer (block 825). As discussed above, replay protected memory data is often much smaller than firmware recovery data (e.g., kilobytes vs. megabytes).

After the various data have been copied to the secure host memory buffer(s), the storage device can begin to operate normally (block 830). During normal operations, the storage device can encounter a critical error (block 840). The critical error can then trip and begin execution of a fatal error response process within the storage device (block 850). Upon completion of the fatal error response process, the process 800 can determine if replay protected memory data is supported (block 855). In certain embodiments, this determination may be made concurrently or even prior to the fatal error response process finishing. If replay protected memory data is not supported, the process 800 can directly move to download the firmware recovery data from the host memory buffer (block 880).

However, if replay protected memory data is supported, then it may be loaded and processed within the storage device (block 860). The loading and processing of the replay protected memory data can be similar to the embodiments described above in FIGS. 4 and 5. Once processed, the storage device can be rebooted and accessed to attempt write commands. In some instances, the storage device is still not able to process host write commands. However, the host data stored within the memory array can still be read and/or copied to another working storage device and/or memory array (block 870).

Once all desired host data is read and/or copied off of the memory array, the storage device can download the firmware recovery data from the secure host memory buffer (block 880). The storage device can then execute a firmware recovery utilizing the firmware recovery data (block 890). Upon completion of the firmware recovery, the storage device may be rebooted and utilized normally again without third-party interventions.

Information as herein shown and described in detail is fully capable of attaining the above-described object of the present disclosure, the presently preferred embodiment of the present disclosure, and is, thus, representative of the subject matter that is broadly contemplated by the present disclosure. The scope of the present disclosure fully encompasses other embodiments that might become obvious to those skilled in the art, and is to be limited, accordingly, by nothing other than the appended claims. Any reference to an element being made in the singular is not intended to mean "one and only one" unless explicitly so stated, but rather "one or more." All structural and functional equivalents to the elements of the above-described preferred embodiment and additional embodiments as regarded by those of ordinary skill in the art are hereby expressly incorporated by reference and are intended to be encompassed by the present claims.

Moreover, no requirement exists for a system or method to address each and every problem sought to be resolved by the present disclosure, for solutions to such problems to be encompassed by the present claims. Furthermore, no element, component, or method step in the present disclosure is intended to be dedicated to the public regardless of whether the element, component, or method step is explicitly recited in the claims. Various changes and modifications in form, material, work-piece, and fabrication material detail can be made, without departing from the spirit and scope of the present disclosure, as set forth in the appended claims, as might be apparent to those of ordinary skill in the art, are also encompassed by the present disclosure.

What is claimed is:

1. A device comprising:
   a processor;
   a memory array comprising a plurality of memory devices; and
   a storage device recovery logic configured to:
      copy replay protected memory data to a secure host memory buffer;
      detect a critical error occurring within the storage device;
      execute a fatal error response process within the storage device;
      load the replay protected memory data from the secure host memory buffer;
      process the replay protected memory data;
      attempt to write data to the memory array; and
      operate the storage device based on the attempted data write.

2. The device of claim 1, wherein in response to the attempted data write being successful, the storage device continues normal operation.

3. The device of claim 1, wherein in response to the attempted data write failing, the storage device converts to a read-only mode.

4. The device of claim 3, wherein the storage device recovery logic is further configured to perform a data recovery operation upon conversion to read-only mode.

5. The device of claim 1, wherein processing the replay protected data includes access a previous copy of boot information.

6. The device of claim 5, wherein, upon access of a previous copy of boot information, the storage device is rebooted.

7. The device of claim 6, wherein, upon reboot, previously stored internal file system data is accessed by the previous copy of boot information.

8. The device of claim 7, wherein a logical mapping table can be loaded by the previous copy of boot information.

9. The device of claim 1, wherein the loading of the replay protected memory data occurs upon completion of the fatal error response process.

10. A device comprising:
    a processor;
    a memory array comprising a plurality of memory devices; and
    a storage device recovery logic configured to:
       generate firmware recovery data;
       copy the generated firmware recovery data within a secure host memory buffer;
       detect a critical error occurring within the storage device;
       execute a fatal error response process within the storage device;
       load firmware recovery data from the secure host memory buffer; and
       execute a firmware recovery utilizing the firmware recovery data.

11. The device of claim 10, wherein the generation of firmware occurs upon each update of the storage device firmware.

12. The device of claim 10, wherein the storage device recovery logic is further configured to determine if a copy of firmware recover data is present within a host memory buffer prior to updating the storage device firmware.

13. The device of claim 10, wherein upon determining that no firmware recovery data is stored within a host memory buffer, a request to allocate host memory buffer space is generated.

14. The device of claim 10, wherein the storage device recovery logic is further configured to additionally copy the generated firmware recovery data within the memory array.

15. The device of claim 10, wherein the storage device recovery logic is further configured to determine if the storage device health exceeds a predetermined threshold.

16. The device of claim 15, wherein, in response to the storage device health not exceeding the predetermined threshold, the firmware recovery is not executed.

17. The device of claim 15, wherein the execution of the firmware recovery occurs automatically in response to the storage device health exceeding the predetermined threshold.

18. A device comprising:
a processor;
a memory array comprising a plurality of memory devices; and
a storage device recovery logic configured to:
copy firmware recovery data and replay protected memory data to a host memory buffer;
detect a critical error occurring within the storage device;
execute a fatal error response process within the storage device;
load and process the replay protected memory data from the host memory buffer;
recover user data within the memory array;
load the firmware recovery data from the host memory buffer; and
execute a firmware recovery utilizing the firmware recovery data.

19. The device of claim 18, wherein the storage device recovery logic is further configured to:
reboot the storage device; and
return the storage device to normal operations.

20. The device of claim 18, wherein the storage device recovery logic is configured to operate automatically upon detection of a critical error occurring within the storage device.

* * * * *